(12) United States Patent
Stoodley

(10) Patent No.: US 6,996,804 B2
(45) Date of Patent: Feb. 7, 2006

(54) ADAPTING POLYMORPHIC INLINE CACHES FOR MULTITHREADED COMPUTING

(75) Inventor: Kevin Alexander Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 09/872,586

(22) Filed: Jun. 1, 2001

(65) Prior Publication Data

US 2002/0144060 A1   Oct. 3, 2002

(30) Foreign Application Priority Data

Jan. 23, 2001   (CA)   ................................. 2332085

(51) Int. Cl.
  *G06F 9/44*   (2006.01)
(52) U.S. Cl. ...................... 717/116; 717/148; 717/151; 711/118; 707/8
(58) Field of Classification Search ................ 717/151, 717/116, 148, 114, 152, 158; 711/118, 119, 711/121, 129, 173; 707/8
See application file for complete search history.

(56) References Cited

U.S. PATENT DOCUMENTS

| | | | |
|---|---|---|---|
| 5,864,864 A * | 1/1999 | Lerner | 707/102 |
| 6,151,618 A * | 11/2000 | Wahbe et al. | 718/1 |
| 6,182,177 B1 * | 1/2001 | Harriman | 710/112 |
| 6,247,025 B1 * | 6/2001 | Bacon | 707/206 |
| 6,370,687 B1 * | 4/2002 | Shimura | 717/146 |

OTHER PUBLICATIONS

Holzle et al., "Optimizing Dynamically-Typed Object-Oriented Languages With Polymorphic Inline Caches", In Proceedings of the 5th European Conference on Object-Oriented Programming—ECOOP '91, volumn 512 of Lecture Notes in Computer Science, 1991.*

Lee et al. "Reducing Virtual Call Overheads in a Java VM Just-in-Time Compiler", the 4th Annual Workshop on Interaction between Compilers and Computer Architectures, pp. 21-33, 2000.*

Dolby et al., "An evaluation of automatic object inline allocation techniques", Proceedings of the 13th ACM SIGPLAN conference on Object-oriented programming, systems, languages, and applications, pp.: 1-20 , 1998.*

(Continued)

*Primary Examiner*—Antony Nguyen-Ba
(74) *Attorney, Agent, or Firm*—Gregory M. Doudnikoff; Winstead Sechrest & Minick

(57) ABSTRACT

A method and computer system that implements polymorphic inline caches having locking slots. Each time the polymorphic method is called having a new object type, a new slot in the polymorphic inline cache is created. By comparing the object types of new methods with object type values already in the cache, it can readily be determined if a new slot has to be created to accommodate a new object type. Preferably, if two threads wish to access the polymorphic inline cache at the same time, the second thread will wait until the first thread accesses and creates and/or uses its slot because it is likely that the second thread will call the method of the same type. Alternatively, the second thread may access and create and/or use another slot of the polymorphic inline cache because the first slot is locked to all objects other than its type.

23 Claims, 3 Drawing Sheets

OTHER PUBLICATIONS

Ishizaki et al., "A study of devirtualization techniques for a Java Just-In-Time compiler", Proceedings of the 15th ACM SIGPLAN conference on Object-oriented programming, systems, languages, pp.: 294-310, 2000.*

Holzle et al., "Optimizing dynamically-dispatched calls with run-time type feedback", In Proceedings of the 1994 ACM SIGPLAN conference on Programming Language Design and Implementation, 1994.*

Lindholm-Yellin, The JAVA Virtual Machine Specification, Sep. 20, 1996, Addison-Wesley, 7.1, 8.12, 8.13, 8.14.*

Sun MicroSystems, Inc., The JAVA Language: An Overview, Feb. 12, 2001, Sun Microsystems, Inc., http://java.sun.com/docs/overviews/java/java-overview-1.html.*

Gosling-McGilton, The Java Language Environment: Contents, White Paper, May 1996, Sun Microsystems, Inc.*

* cited by examiner

ADAPTING POLYMORPHIC INLINE CACHES FOR MULTITHREADED COMPUTING

BACKGROUND OF THE INVENTION

1. Field of the Invention

This application relates generally to the field of computer software applications and more particularly relates to maintaining the integrity of polymorphic inline caches in multithreaded software computing.

2. Description of the Related Art

Object oriented (OO) programming is becoming the normative computer programming paradigm supplanting procedural programming. OO languages, such as Smalltalk, C++, and Java, allow programmers to approach their programming tasks in what is believed to be more natural and intuitive approach by using objects rather than procedures as the fundamental building blocks for creating computer programs. Objects are small reusable sections of program code that can be quickly and easily combined to create new and many different applications. Conceptually, an object is an entity that is able to save information, referred to as its state, and offers a number of behaviors or functions which examine and/or affect this state. An object may model the attributes or characteristics of the real-world object and, in many cases, may also model its behavior. For example, an OO employee object may have certain attributes of a real employee such as a name, an address, an employee number, etc., and could respond like a real employee in that the employee object could provide the employee's address or the employee's status, e.g., "on vacation," when asked. Another example may be a calendar object which may be used in several applications such as a scheduling application, a presentation application, and/or a data base application to calculate employee's vacation and pay, etc.

A fundamental concept in OO programming is the class. A class is a template or prototype that defines a type of object and specifies the attributes and methods associated with objects or members of the class. An object that belongs to a certain class is called an instance of that class. The attributes are represented in an object by the values of instance variables. Objects of the same class have the same definition for their operations and information structures. Knowing about a class, a programmer may create a new object as another instance of the class. An object is created or instantiated at runtime, i.e., when the computer executes a statement in the program.

Encapsulation, inheritance and polymorphism are three important concepts that further differentiate OO from procedural programming. Encapsulation means keeping the data structure and the methods/functions that process the data together in the same class. Quite simply, if encapsulated, the methods/functions of one class are private and may not access data structures of another class nor may methods/functions of other classes access the private data structure within the class. If the classes are public, however, the data and/or methods and functions can be accessed by an object of another class or subclass.

Inheritance is the ability to derive a new class from one or more existing classes. The new class, known as a derived class or a subclass, may inherit or incorporate all properties of a base class or the superclass including its attributes and its methods. The derived class may be further defined to include additional properties. An illustration using classes of geometrical shapes, for example a new class square may inherit all the attributes and methods of objects in the class rectangle but the new class square can be modified so that the methods to calculate area or perimeter can be particularized using polymorphism.

Polymorphism is a powerful OO concept that allows the same name to be used in a base class and an inherited or derived class, but the derived class may provide a different version of a method with the same name that exists in the base class. Like inheritance, polymorphism allows code reuse, e.g., a programmer may use code that someone previously wrote and the programmer might not even have the source code, but may provide other code to say "my code behaves exactly like that other code, except for these one or two routines." The real advantage of polymorphism occurs at runtime. A programmer does not always know the class of which a variable is an instance because a variable is allowed to hold not only an instance of its base class but also an instance of any derived class. The most appropriate method for the type, e.g., whether the instance is a shape, a rectangle, a square, or a circle, is automatically selected during runtime because the receiving instance is responsible for its own behavior.

For interpretative programming languages such as the Java™ programming language and Smalltalk, the OO source code is first converted to an architecture-neutral distribution format called bytecode. The bytecode sequences are then interpreted for each computer processor architecture and operating system using a virtual machine. Recall that objects are created when the program executes so that while platform-neutrality, flexibility, and reusability are significant advantages of OO from the perspective of a software developer, execution by interpretation may impose heavy performance penalties because of the runtime overhead of the bytecode instruction fetch and decode. One means of improving the runtime performance of a virtual machine is to use a just-time-time (JIT) compiler to convert the bytecode sequences "on the fly" into a equivalent sequence of the native or machine code of the underlying machine architecture. While JIT compilers improve performance, the overall program execution time now includes the compilation overhead of a JIT compiler.

A central feature of OO languages is the capability to dispatch polymorphic methods. It is important that the JIT compiler produce efficient code to quickly invoke these polymorphic methods. In early OO implementations, the virtual machine interpreted bytecode to invoke polymorphic methods. The virtual machine would search and find the bytecode, switch to the found object, and then perform a linear search of a method dictionary using the type of the object on which the virtual call was being made. The process was very slow. To speed up the search, the OO language Smalltalk used a hash table keying on the method and the receiving object type. If a search failed on the hash table, the original lookup is performed and its result is put into the hash table keyed on the method and the receiving object. The majority of the time, the searched-for method was already in the hash table so increasing the size of the hash table did not yield significantly better performance.

Then, a different approach emerged to generate and store machine code for the lookup procedures in a lookup or inline cache. Calling a method could be sped up further by observing that the object type at a given call site rarely varies. If a method is called on an object of type X at a particular call site, it is very likely that the next time the same method is executed at that call site, it will also be on object of type X. This locality of type usage was exploited by caching the looked-up method address at the call site, e.g., by overwriting the call instruction. A lookup cache maps the object type, method name pairs to method addresses and holds the most recently used results. The first time a method is called on an instance from a particular call site, the method's address is stored in the lookup cache. Subsequent executions of the code at the call site then jump directly to the method whose address was cached thereby avoiding any searches. Thus, when a method is called, the lookup cache is first consulted. If the cache probe fails, the normal more expensive search is performed and the results are stored in the cache, possibly replacing older search results.

Even with a lookup cache, however, calling a method still takes considerably longer than calling a simple procedure because the cache must be probed for every method called. Thus, these inline lookup caches are effective only if the object type and thus the method's address remains relatively constant at a call site. Performance is hampered when the objects are not the same type and there is a resulting cache miss.

Although inline caching works very well for the majority of call sites, it does not speed up a polymorphic call site which has several equally likely object types because the method's address switches back and forth between different methods. Worse, inline caching may even slow down the method calls because of the extra overhead associated with cache misses. For a typical lookup cache miss, the address of the new method is put into the cache and the old flushed. If the runtime program has many polymorphic swaps then twenty percent of runtime can be spent swapping the code of called methods in and out of the cache. If a method is recompiled, moreover, every entry for that method must be flushed from the lookup cache because it is too complex to work out just the entry that corresponds to that method on that class.

Because of standard OO practices there tend to be many relatively small methods which during execution result in many method invocations, as another example, there may be a method solely for accessing a private field variable. A large percentage of method invocations, moreover, are monomorphic, meaning that they always bind to one class and a smaller percentage bind to no more than eight classes. Less than one percent of the method calls link to more than eight classes. An examination of polymorphic call sites show that the degree of polymorphism may be small. The degree of polymorphism may be classified as: (a) monomorphic if the calls have only one object type; (b) polymorphic if the calls actually have only few object types; or (c) megamorphic which have very many object types.

Thus, the polymorphic inline cache (PIC) evolved from the monomorphic lookup cache described above. PICs rely on the observed behaviour that, in reality, very few call sites are megamorphic and that PICs work very well for monomorphic, pseudo monomorphic, and polymorphic call sites. PICs collect type information used by the compiler to produce more efficient code, especially where type analysis fails to extract useful type information. The type that dominates a particular PIC is often not known until the code has been run a few times so most implementations rely on self-modifying code to build the PIC in place from a template PIC in the code at the call site.

An example of a PIC is given. Given a class hierarchy in which the derived classes circle and rectangle derive from the base class shape, the base class shape introduces a method display and that both circle and rectangle override that method with their own implementations. Suppose that a display method is called on all shapes from a list of shapes and that so far all the shapes have been rectangles. In other words, the display method has been called monomorphically, so the situation is identical to normal inline caching. Now suppose the next shape is a circle. The inline cache would call the display method for rectangles because it has thus far been the only type of shape. The inline cache code would detect a cache miss for the type circle and call the search routine to search for the display method for a circle. With normal inline caching, the display method for circles would then replace the display method for rectangles. Searching and replacing to update the cache would occur every time a display method for a different object type was called from that call site.

With PICs, when the invoked object type does not equal the last object type found in the lookup cache, the virtual machine compares the new object type to the second-last object type found, then the third last and so on. If the cache misses again, e.g., if the object type is neither a rectangle nor a circle, the PIC is simply extended to include new object types. A new method is added to the lookup cache every time the virtual machine fails to match an invoked class already existing in the cache. Eventually, the PIC will contain all cases seen in practice, and there will be no more cache misses or lookups. Thus, a PIC may be an extensible cache in which no cache item is ever displaced by another item. Practicably, however, a PIC is limited in size for obvious performance reasons.

In an operating system having multiple software threads that can be executing the same code, self-modification of the PIC poses significant problems. First, most implementations of PICs have multiple slots to accommodate call sites having more than one call destination which is frequently called. In a software multithreading environment, it is necessary to ensure that two or more threads executing through the same PIC do not interfere with each other and leave the PIC in an inconsistent, i.e., incorrect, state. If one thread is in the process of building a PIC slot and a second thread executes into the PIC, it is preferable that the second thread not try to build its own PIC slot because it is highly likely that the second thread calls a method on the same object type as one called by the first thread. It is undesirable to build two or more slots for the same object type for performance reasons. While one slot of a PIC is locked by a thread, moreover, other threads should be able to use other slots in that or any other PIC to achieve high performance and high scalability. Threads that are not executing through a particular call site or threads not executing that particular method, moreover, should be able to continue normal execution while the PIC is being built.

There is thus a need in the industry for rapid and efficient compilation and execution of dynamic OO programs in a software multithreaded environment.

SUMMARY OF THE INVENTION

These needs and others that will become apparent to one skilled in the art are satisfied by a method to implement a polymorphic call site in a computer system executing an object oriented program, the method comprising the steps of: creating a template of a polymorphic inline cache for a polymorphic call site, the template having a plurality of slots; executing the polymorphic inline cache with an object of type k; invoking a polymorphic inline cache initialisation routine; finding an available k slot of the polymorphic inline cache; locking the k slot of the polymorphic inline cache; searching for a k method to call for the object of type k; filling the k slot with a call instruction to the k method;

unlocking the k slot to complete the k slot; and calling the k method of the object of type k.

A first thread may initialise and/or access the k slot at the same time a second thread is initialising and/or accessing a slot other than the k slot. Under these circumstances, the second thread may wait until after the k slot has been unlocked and completed. Alternatively, the second thread may search for and call the k method and leave the polymorphic inline cache unchanged.

A polymorphic inline cache may be created for each polymorphic call site.

The step of creating a template of the polymorphic call site may further comprise putting a bit in each slot to indicate that each slot is empty. Alternatively, the step of creating a template of the polymorphic call site may further comprise inserting a first illegal type value in a compare instruction of every slot of the polymorphic inline cache to indicate each slot is empty. In that case, the step of locking the k slot of the polymorphic inline cache may comprise replacing the first illegal type value in the compare instruction of the k slot with a second illegal type value to indicate the k slot is in use. The step of unlocking the k slot may further comprise replacing the second illegal type value in the compare instruction of the k slot with a value of type k.

The step of locking the k slot of the polymorphic inline cache may further comprise changing a bit in the k slot to indicate that the k slot is in use.

The method of implementing the polymorphic call site may further comprises updating the polymorphic inline cache so that the object of type k+1 will initialise a corresponding k+1 slot. This step of updating may be accomplished in such a way so the object of type k+1 will initialise the corresponding k+1 slot by inspecting the polymorphic inline cache to find the next empty slot. In another embodiment, the step of updating the polymorphic inline cache so that the object of type k+1 will initialise the corresponding k+1 slot may comprise maintaining the state of the k slot or the k+1 slot. In either case, the polymorphic inline cache initialisation routine may be the same for every object of the polymorphic inline cache. And yet, the step of updating the polymorphic inline cache so that the object of type k+1 will initialise a corresponding k+1 slot may yet further comprise modifying the initialisation routine so that upon a cache miss of the k slot, the k+1 initialisation routine is called.

The step of modifying the initialisation routine may further comprise calling a different initialisation route for every object of a different type.

The invention may also be considered a program product for creating a polymorphic inline cache comprising a signal-bearing medium carrying thereon an initialiser to initialise, fill, and lock a plurality of slots in at least one polymorphic inline cache so that each slot of the at least one polymorphic inline cache has a method corresponding to an object type.

The invention is also a program product for using a polymorphic inline cache comprising a signal-bearing medium carrying thereon at least one polymorphic inline cache for each polymorphic call site, each polymorphic inline cache having a plurality of slots, each slot pertaining to an object of one type of the same polymorphic call site.

The invention may further be considered a computer system for executing an application, comprising: a central processing unit executing the application; a main memory connected to the central processing unit with an internal bus; at least one input/output device connected to said communication bus and connected to a network interface to an external computer network; a just-in-time compiler to compile object oriented applications for execution on the central processing unit; and a polymorphic inline cache created by the just-in-time compiler, the polymorphic inline cache implementing a lockable slot for each individual object type to a polymorphic call site in the application.

The invention is also a computer system for executing an application, comprising: a processor executing the application; a memory connected to the processor with an internal bus; a network interface to connect to an external computer network; and a polymorphic inline cache having a plurality of slots, each slot allocated to an object type of a method and locked to other object types of a polymorphic call site in the application.

The invention may further be considered a method of creating a polymorphic inline cache in a just-in-time compiler on a computer, comprising the steps of: executing a program; calling a method having a first object type from the executing program; creating a first slot in the polymorphic inline cache; locking and filling the first slot with a call to the method having the first object type; returning to the executing program; calling a second method having a second object type from the executing program, the second method being polymorphic with respect to the first method; creating a second slot in the polymorphic inline cache; locking and filling the second slot with a call to the second method having the second object type; returning to the executing program; calling a subsequent method having a subsequent object type from the executing program, the subsequent method being polymorphic with respect to the first and second methods; creating a subsequent slot in the polymorphic inline cache; locking and filling the subsequent slot with a call to the subsequent method having the subsequent type; and returning to the executing program.

The invention is also a method of using a polymorphic inline cache, comprising the steps of: calling a method having a first object type from an executing object oriented program; locking a first slot of the polymorphic inline cache with a call to the method of the first object type; and executing the first slot of the polymorphic inline cache. The executing object oriented program may yet call a method having a second object type, in which case the second slot of the polymorphic inline cache is locked with a call to the method of the second object type; and can be executed. The first slot of the polymorphic inline cache may be executed simultaneously with the second slot. The method of the first object type may be called from a first thread which executing independently from an executing second thread calling the method of the second object type. The inventive method may further comprise: calling a method having a second object type; waiting until the method of the first object type has executed; determining that the second object type and the first object type are the same object type; and not creating a second slot of the polymorphic inline cache with a call to the method of the second type.

The invention may also be a computer system to execute an object oriented program, comprising: means to execute an object oriented program; means to call a first method from a first slot of a polymorphic inline cache; means to call a second method from a second slot of a polymorphic inline cache; means to determine if the first method and the second method have the same object type; means to call the first method and second method simultaneously if they are not of the same object type; and if they are of the same object type, means to prevent the call to second method from the second first slot of the polymorphic inline cache until the means to call the first method has completed. The first method may be called from a first thread and the second method may be called from an independently executing second thread. The computer system may further comprise means to invoke a first polymorphic inline cache initialisation routine; means to lock the first slot of the polymorphic inline cache; means to fill the first slot with a call instruction to the first method while the first slot is locked; means to update the polymorphic inline cache so that a second method of a second type will invoke a second polymorphic inline cache initialisation routine; means to make the first slot available to the first method; means to call the first method; means to lock the second slot of the polymorphic inline cache; means to fill the second slot with a call instruction to the second method while the second slot is locked; and means to update the polymorphic inline cache so that a Nth method of a Nth type will invoke a Nth polymorphic inline cache initialisation routine. The first, second, and Nth polymorphic inline cache initialisation routines may be the same. The first polymorphic inline cache initialisation routine may be called from a first thread simultaneously while an independently executing second or Nth thread is calling the second or Nth method or is calling the second or Nth polymorphic inline cache initialisation routine.

The inventions, the advantages and features will become more apparent by the following description of the invention which is read in conjunction with the Drawing.

DESCRIPTION OF THE PREFERRED EMBODIMENT

Figure 1:
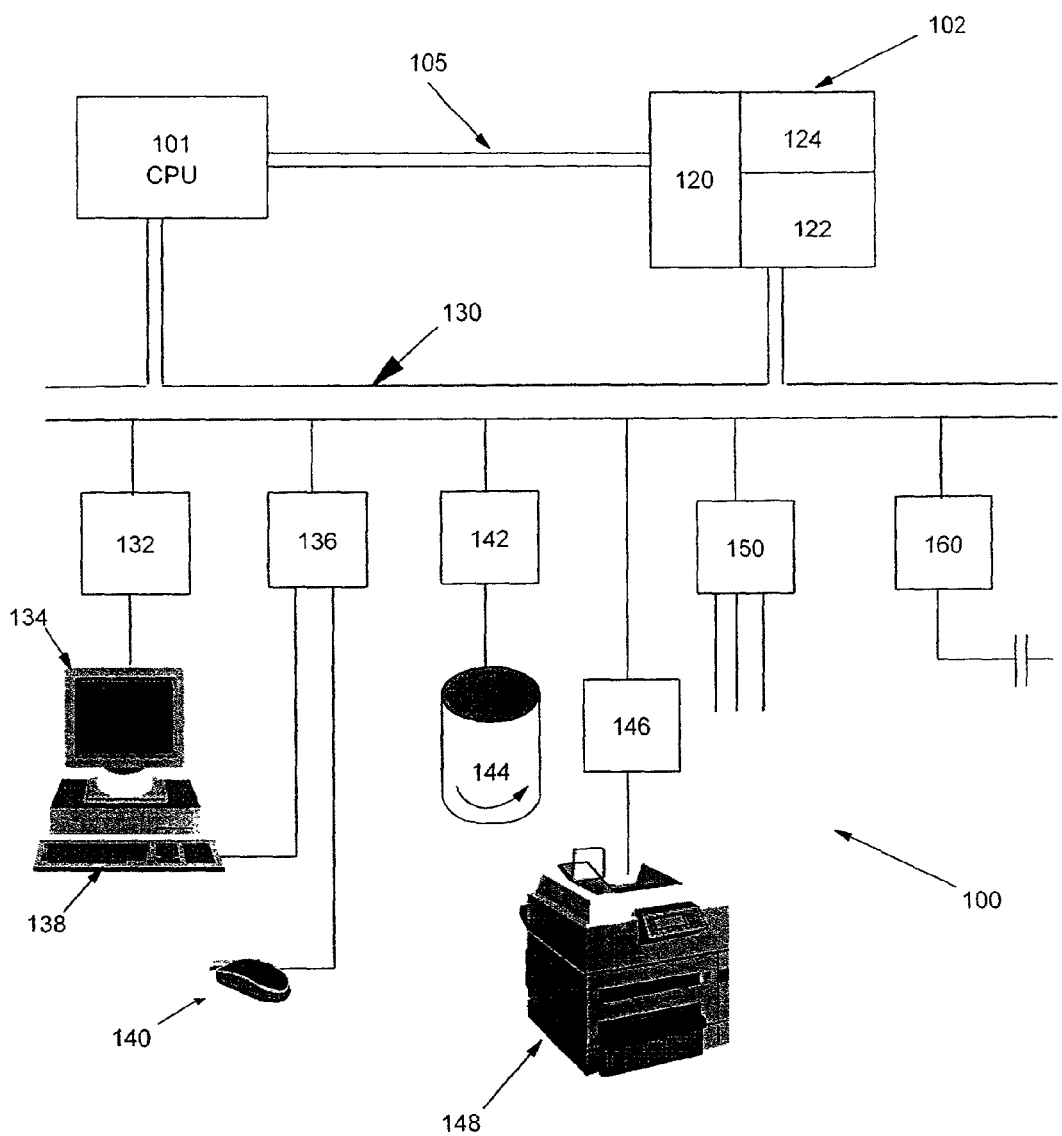
FIG. 1 is a high-level block diagram of a computer system capable of implementing the preferred embodiment of the invention.

Referring to the Drawing, wherein like numbers denote like parts throughout the several views, FIG. 1 shows a simplified block diagram of a high-level computer system 100, consistent with an embodiment of the invention. Computer system 100 may comprise central processing unit (CPU) 101 which may be a programmable processor, executing instructions stored in memory 102. While a single CPU is shown in FIG. 1, it should be understood that computer systems having multiple CPUs could be used. Connected to the CPU 101 through an internal bus 105 and/or an external system bus 130 is memory 102. Memory 102 is a random-access semiconductor memory for storing data and programs; memory is shown conceptually as a single monolithic entity but it is well known that memory is often arranged in a hierarchy of caches and other memory devices. Operating system 120 and applications 122 reside in memory 102. Operating system 120 provides, inter alia, functions such as device interfaces, management of memory pages, management of multiple tasks, etc. as is known in the art. CPU 101 is suitably programmed to execute the operating system 120 and instructions of applications 122 retrieved from memory 102. Memory 102 has the necessary elements to carry out the preferred embodiment by having a JIT compiler as part of a virtual machine 124 capable of building a polymorphic inline cache as described below. In yet another embodiment, once a polymorphic inline cache has been built, a JIT compiler is not necessary for the use of a PIC, as will be discussed later. Applications 122 may include legacy applications and if it includes a server software application, network interface 108 may interact with the server software application 122 to enable computer system 100 to be a network server.

Communication bus 130 supports transfer of data, commands and other information between different devices; while shown in simplified form as a single bus, it may be structured as multiple buses, and may be arranged in a hierarchical form. Display adapter 132 supports video display 134 which may be a cathode-ray tube display, a flat panel display, or a touch panel, although other display technologies may be used. Keyboard/pointer adapter 136 supports keyboard 138 and pointing device 140 depicted as a mouse, it being understood that other forms of input devices could be used. Storage adapter 142 supports one or more data storage devices 144 which may be rotating magnetic hard disk drives or CD-ROM drives although other data storage devices could be used. Printer adapter 146 supports printer 148. Adapter 150 may connect a wide variety of devices to the computer system 100 and to other adapters connected to other devices such as, but not limited to, speakers, audio and visual equipment, tape drives, optical drives, printers, disk controllers, other bus adaptÜers, PCI adapters, workstations using one or more protocols including, but not limited to, Token Ring, Gigabyte Ethernet, Ethernet, Fibre Channel, SSA, Fiber Channel Arbitrated Loop (FCAL), Ultra3 SCSI, Infiniband, FDDI, ATM, 1394, ESCON, wireless relays, Twinax, LAN connections, WAN connections, high performance graphics, etc., as is known in the art. Network interface 160 provides a physical interface to a network, such as the Internet. This interface may comprise a modem connected to a telephone line through which an Internet access provider or online service provider is reached, but increasingly other higher bandwidth interfaces are implemented. For example, computer system 100 may be connected to another network server via a local area network using an Ethernet, Token Ring, or other protocol, the second network server in turn being connected to the Internet. Alternatively, network interface 160 may be provided through cable television, fiber optics, satellites, wireless, or other connections. The representation of FIG. 1 is intended as an exemplary simplified representation of a high-end server, it being understood that in other computer systems 100 many variations in system configuration are possible in addition to those mentioned here.

Finally, computer system 100 need not be a computer at all, but may be a simpler appliance-like client device, also called an embedded device, having less processing power and memory such as a network terminal, a thin client, a terminal-like devices, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pagers, simple messaging devices and wearable devices. Thus when the computer system 100 is a mobile or an embedded device, the adapters 150 and network interfaces 160 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a computer system 100. When computer system 100 is an embedded device, it need not have a virtual machine but only be capable of using the polymorphic inline caches as described below.

As will be described in detail below, aspects of the preferred embodiment pertain to a specific method having steps implementable on a computer system 100. In an alternative embodiment, the capability to build and use a polymorphic inline cache in accordance with principles of the invention may be implemented as a computer program-product for use with the computer system 100. The programs defining the functions of the preferred embodiment can be delivered to the computer system 100 and/or to the peripheral device for installation on a connected adapter via a variety of signal-bearing media, which include, but are not limited to: (a) information permanently stored on non-writable storage media, e.g., read only memory devices within either computer such as CD-ROM disks readable by CD-ROM; (b) alterable information stored on writable storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

Figure 2:
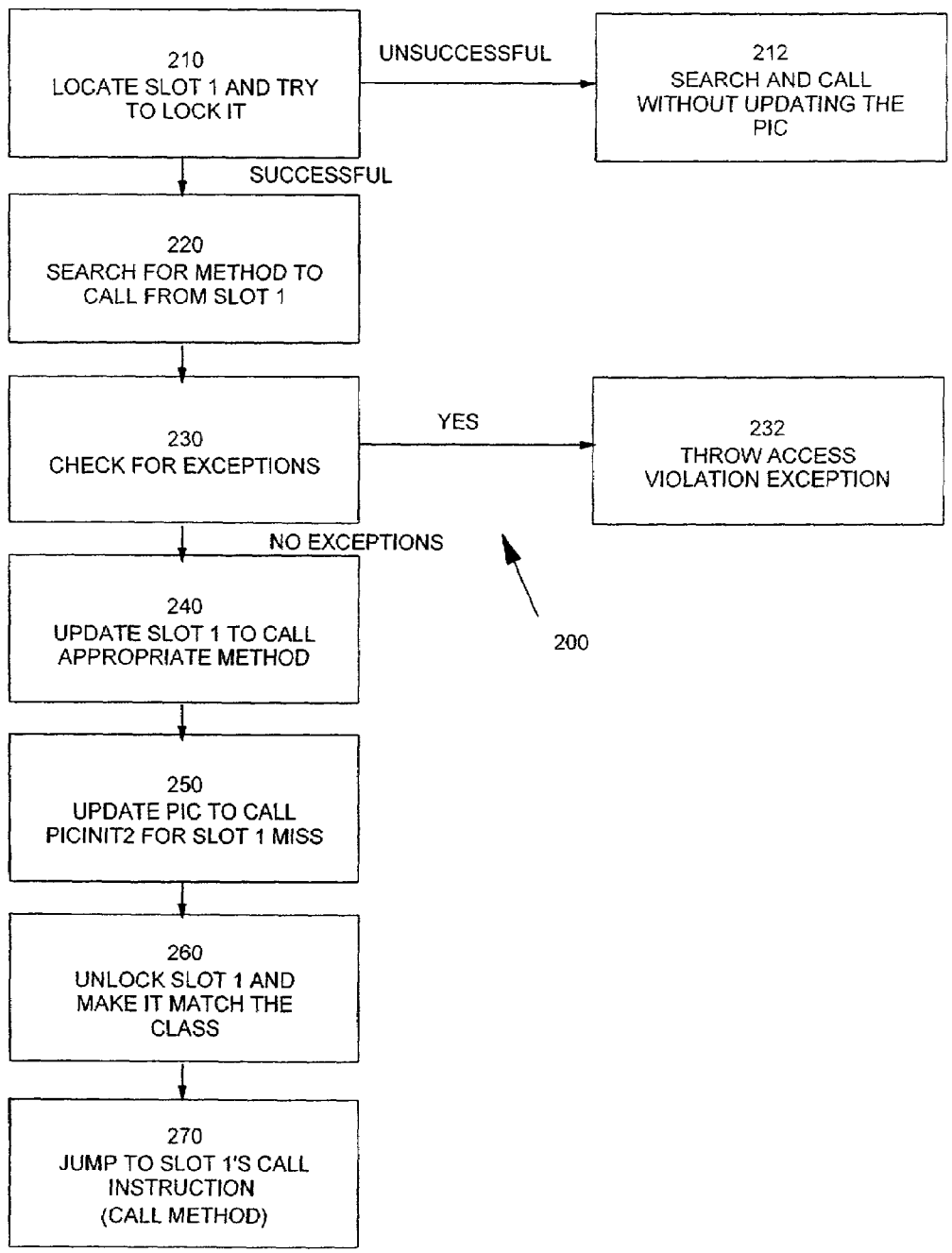
FIG. 2 is a simplified process diagram of how a PIC is built in a multithreading environment in accordance with an embodiment of the invention.

FIG. 2 is a simplified block diagram of how a PIC enabled for software multithreading in accordance with the preferred embodiment of the invention can be created in a virtual machine. Preferably, a virtual machine 124 uses a JIT compiler to create a template for and build each PIC but once built, the PICs may be used in other computer systems and embedded devices not having a JIT compiler. In the preferred embodiment, a PIC is a virtual cache comprising a number of entries or slots, each further comprising a method called by a polymorphic call site. Preferably, the template has a finite number of slots because, in actuality, there are only a small number of polymorphic methods associated with a call site. Each slot of a PIC must be able to accomplish at least three operations: an operation to determine if the called method is in the PIC, i.e., is there a cache hit or a cache miss on that slot; an operation to call the method if there is a cache hit; and an operation to get back to the code following the call site. The compare operation is intended to determine if the method associated with the object type called is within that slot of the PIC, as stated above. If there is a cache hit on the slot, there is an operation to call the method. If there is a cache miss on the slot, depending upon the implementation, there may be operations to branch to an another slot in the PIC, to an initialisation routine to create another slot in the PIC, or to the called method without using the PIC. The final operation returns execution to the next instruction in the program which called the polymorphic call site. In accordance with one embodiment of the invention, the PIC builds itself through the use of self-modifying code.

In FIG. 2, a method for a particular object type is called from a program compiled at runtime and executing within the virtual machine. In step 210, the template of the PIC is located and the position of slot1 is ascertained. In the preferred embodiment, the first slot of the template uniquely uses the compare instruction of the PIC to indicate that the PIC is empty. The type value is contained in the immediate field of a "compare register to an immediate value" instruction. The type value in the compare instruction is preset to an illegal value, e.g., −1, to ensure a cache miss which will jump/branch to a PIC initialisation routine named _picInit1. Slot1 is then locked so that other threads in a multithreaded context are not able to use or modify this slot while the slot is being built or otherwise in use. There are several methods to lock the slot: a bit can be changed in the slot itself, but in the preferred embodiment, the self-modifying code of the PIC again changes the type value in the compare instruction. To lock the PIC slot, the type value may be set to another illegal value, e.g., 0, to indicate that the slot is in use. In the preferred embodiment, if the type value in the compare instruction is −1, then the PIC branches to the call to an initialisation routine; if the type value in the compare instruction is 0, then call to the initialisation routine but now the type value of 0 indicates the slot is locked so then in step 212, a search is made for the appropriate method and the method is called without updating the PIC. Note, the innovative use of two illegal type values in the compare instruction prevents a second thread from executing a PIC slot that is being modified while at the same time providing a lock of the PIC slot. Thus, a PIC slot can be individually locked without adding to the memory cost of maintaining the PIC.

If, however, in step 220, slot1 has been located and locked, then a search is performed for the method to call from slot1. In step 230, a check is made for exceptions and if there are exceptions, access is prohibited and the virtual machine is notified that a violation occurs. If, however, there are no exceptions, then in step 240, the call instruction of slot1 is updated to call the requested method of that type. In step 250, the conditional branch instruction of slot1 is further updated to jump or branch to a call to an initialisation routine for the second slot in case of a slot1 cache miss. In step 260, slot1 then becomes available to the executing program when the program calls methods of the object type stored in slot1. In the preferred embodiment, the slot is unlocked by replacing the type value in the compare instruction with the object type in the first call to the polymorphic call site. In any event, there may be other methods of determining the next available slot when a new object type is called, for instance, the PIC could maintain the state of either the last updated or the next available slot; another way is to simply inspect each PIC slot to find the first empty slot. In step 270, the executing programs jump to the call method of slot1. Slot1 of the PIC is then completed and execution returns to the program which called the polymorphic call site associated with the PIC.

Figure 3:
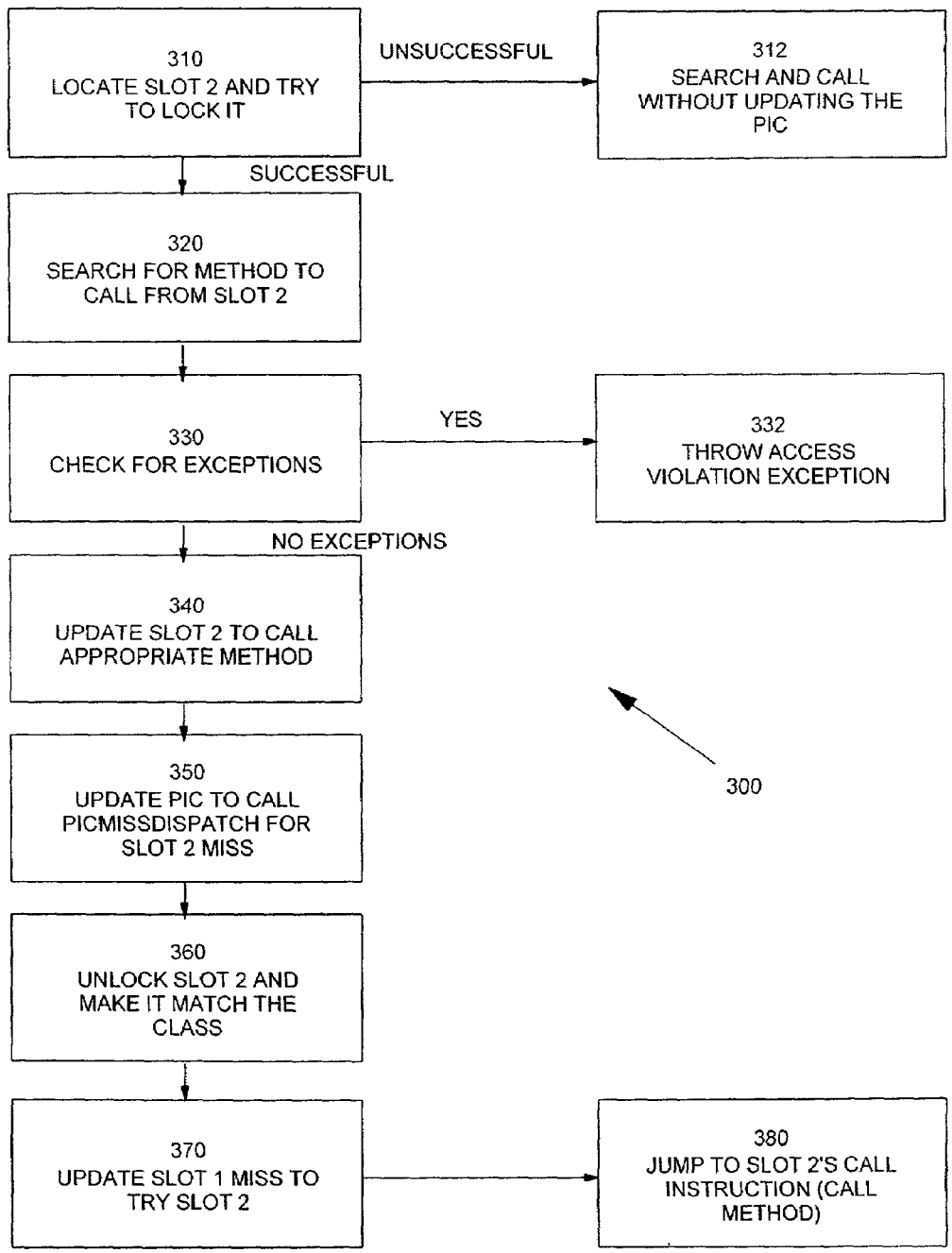
FIG. 3 is a simplified process diagram of how the PIC of FIG. 2 is used in accordance with an embodiment of the invention.

FIG. 3 is a simplified flow chart of how a PIC can be updated in a virtual machine. In FIG. 3, a method for an object type different than the object type associated with slot1 is called from a program executing within the virtual machine. In step 310, the method locates slot2 of the PIC template and tries to lock slot2 so that other threads in a multithreaded context are not able to use or modify this slot while the slot is being built. Again, in the preferred embodiment, slot2 is locked by modifying its compare instruction with a second illegal type value, e.g., 0. If slot2 cannot be locked, then in step 312, a search is made for the appropriate method and the method is called without updating the PIC. If, however, in step 320, slot2 has been located and locked, then a search for the method to call from slot2 is performed. In step 330, a check is made for exceptions and if there are any exceptions, access is prohibited and the virtual machine is notified that a violation occurs. If, however, there are no exceptions, then in step 340, slot2 of the PIC is updated to call the requested method. In step 350, the PIC is further updated to create a new slot by, for example, calling a routine _picInitk (not shown) or a routine _picMissDispatch in the case of a slot2 miss. Slot2 is unlocked to make it available for use in step 360. In the preferred embodiment, the self-modifying PIC unlocks slot2 and makes the slot match the class by replacing the type value in the compare instruction with the object type of slot2. In step 370, the PIC is updated that in the event of a slot1 miss, jump to the first instruction of slot2, and if the object type matches the type value in the compare instruction of slot2, then call the method for slot2. In step 380, the executing programs jump to the call instruction of the method of slot2.

The following examples provide actual code to further illustrate the principles of the invention. Assume that class 'A' introduces method foo and classes 'B' and 'C' subclasses of class 'A' and introduce their own methods of too; namely B.foo and C.foo are polymorphic methods of A.foo and override it.

The first example of pseudocode of the preferred embodiment represents the initial state of the PIC template having two slots. It is to be understood that a PIC template in accordance with the invention may have more than two slots, depending upon the number of object types associated with a polymorphic call site. The instructions marked with an * are executed the first time this PIC is executed. Register R1 contains a unique type value of the object on which this method is being called from the executing program. In the example, R1 contains the unique id for type 'A', i.e., that an object of type 'A' is calling the foo method the first time the PIC template is invoked. For the first slot, a compare function, cmp, compares the value of R1 with an illegal type value of −1. Because R1 can never be equal to the illegal type value, the thread of execution executes the instruction jne to jump to the code labeled miss calls _picInit1 the first time around. _picInit1 is a runtime routine that updates and locks slot1 of the PIC by changing the illegal type value of the cmp instruction to a different illegal type value, e.g., 0. _picInit1 further updates slot1 by filling in the destination of call instruction and by changing the type value of the cmp instruction to the value of R1. After the method invoked by the call instruction completes, the program ends by jumping to done.

EXAMPLE 1

```
Slot1:
    cmp    R1, illegal type value   ; *  This compare instruction is set
                                    ;    up in the template and is
                                    ;    guaranteed to fail the first
                                    ;    time through.
    jne    miss                     ; *  This is the conditional branch
                                    ;    instruction and will branch
                                    ;    around the first slot if the
                                    ;    comparison fails.
    call                            ;    The is the call or dispatch
                                    ;    instruction to execute when
                                    ;    the object type R1 matches
                                    ;    the type value of the type
                                    ;    value of the slot. Call is
                                    ;    initially left blank. Its
                                    ;    destination will be filled in
                                    ;    when the slot is initialised.
    jmp    done                     ;    Jump to code following the
                                    ;    PIC once the call returns.
```

-continued

```
Slot2:
    cmp    R1, illegal type value   ;    The compare is guaranteed to
                                    ;    fail the first time through.
    jne    miss                     ;    Branch around the second slot
                                    ;    if the comparison fails.
    call                            ;    Call is initially left blank. Its
                                    ;    destination will be filled in
                                    ;    when the slot is initialised.
    jmp    done                     ;    Jump to the code following
                                    ;    the PIC once the call returns.
    dd     constant pool            ;    This section (8 bytes) is never
    dd     constant pool index      ;    executed. Instead it contains
                                    ;    data that is easily locatable by
                                    ;    the by the _picInitX routines.
                                    ;    The data is used by them to
                                    ;    describe which particular
                                    ;    method is to be dispatched
                                    ;    from this site. It also allows
                                    ;    the runtime to do accessibility
                                    ;    checks to make sure the call is
                                    ;    allowed under the language
                                    ;    rules and class hierarchy of
                                    ;    the program.
miss:
    call   _picInit1                ; *  Call to _picInit1. _picInit1 is
                                    ;    a runtime routine that does all
                                    ;    the work of properly updating
                                    ;    the first slot of a PIC.
done:
```

In the above example, the routine _picInit1 initialized and updated the PIC. Now a method invocation compares its object type with the type value of slot1, type 'A'. If the object type of R1 matches the type value for 'A', then the method A.foo is called. Instructions marked with an A are executed if an object of type 'A' is to have its foo method executed at this site. No further change to the PIC will occur until an object other than 'A' invokes its foo method from this site. In accordance with principles of the invention, the PIC template has been set up so that the next empty slot always has an illegal type value to ensure that the next empty slot is initialised and updated with the appropriate type value and method call. Now in Example 2, a second method of a second object type calls to the same polymorphic site. The object type of R1 is not 'A' upon evaluation by the cmp instruction so upon the slot1 cache miss, the routine jumps (jne miss) to _picInit2. _picInit2 first changes the type value of the compare instruction for the second slot to a second illegal type value, e.g. 0, to indicate the second slot is in use. Then the routine _picInit2 updates slot2 by filling in the destination of the call instruction with B.foo and by changing the type value of the compare instruction for type 'B'. It also updates the conditional branch instruction of a slot2 cache miss by calling the routine _picMissDispatch (see pseudocode Example3) to search for the a method outside of the PIC. In the following example, instructions marked with a B or C are executed if objects of these types have their foo method executed from this site.

EXAMPLE 2

```
Slot1:
    cmp    R1, type value for 'A'   ; ABC  This compare is true for
                                    ;      objects of type 'A' but
                                    ;      false for all other object
                                    ;      types, such as 'B' and
                                    ;      'C'.
```

-continued

```
          jne   miss              ; ABC   Branch around the first
                                  ;       slot if the comparison
                                  ;       fails. Otherwise, fall
                                  ;       through to next instruc-
                                  ;       tion.
          call  A.foo             ; A     Call to A.foo
          jmp   done              ; A     Jump to code following
                                  ;       the PIC once the call
                                  ;       returns.
Slot2:
          cmp   R1, illegal type value ;  The compare is guaran-
                                  ;       teed to fail the first time
                                  ;       through.
          jne   miss              ;       Branch around the
                                  ;       second slot if the com-
                                  ;       parison fails.
          call                    ;       Call is initially left blank.
                                  ;       Its destination will be
                                  ;       filled in when the slot is
                                  ;       initialised.
          jmp   done              ;       Jump to the code follow-
                                  ;       ing the PIC once the call
                                  ;       returns.
          dd    constant pool     ;       This section (8 bytes) is
          dd    constant pool index ;     never executed. Instead it
                                  ;       contains data that is
                                  ;       easily locatable by the
                                  ;       _picInitX routines. The
                                  ;       data is used by them to
                                  ;       describe which particular
                                  ;       method is to be dis-
                                  ;       patched from this site. It
                                  ;       also allows the runtime
                                  ;       to do accessibility checks
                                  ;       to make sure the call is
                                  ;       allowed under the lan-
                                  ;       guage rules and class
                                  ;       hierarchy of the program.
miss:
          call  _picInit2         ; BC    Call to _picInit2.
                                  ;       _picInit2 is a generic
                                  ;       routine that does all the
                                  ;       work of properly up-
                                  ;       dating the second slot of
                                  ;       a PIC.
done:
```

Example 3 represents the pseudocode of the PIC after _picInit2 has run. The PIC is now complete and will not be changed further in this implementation wherein the PIC has two slots. In Example 3, it is assumed that an object of type 'B' was the object which caused _picInit2 to be run.

EXAMPLE 3

```
Slot1:
          cmp   R1, type value for 'A'  ; ABC  This compare is true for
                                        ;      objects of type 'A' but
                                        ;      false for all other types,
                                        ;      such as 'B' and 'C'.
          jne   Slot2                   ; ABC  Branch around the first
                                        ;      slot if the comparison
                                        ;      fails. Otherwise, fall
                                        ;      through to next instruc-
                                        ;      tion.
          call  A.foo                   ; A    Call to A.foo
          jmp   done                    ; A    Jump to code following
                                        ;      the PIC once the call
                                        ;      returns.
Slot2:
          cmp   R1, type value for 'B'  ; BC   The compare is guaran-
                                        ;      teed to fail the first time
                                        ;      through.
          jne   miss                    ; BC   Branch around the sec-
                                        ;      ond slot if the com-
                                        ;      parison fails.
          call  B.foo                   ; B    Call to B.foo
          jmp   done                    ; B    Jump to code following
                                        ;      the PIC once the call
                                        ;      returns.
          dd    constant pool           ;      This section (8 bytes) is
          dd    constant pool index     ;      never executed. Instead it
                                        ;      contains data that is
                                        ;      easily locatable by the
                                        ;      _picInitX routines. The
                                        ;      data is used by them to
                                        ;      describe which particular
                                        ;      method is to be dis-
                                        ;      patched from this site. It
                                        ;      also allows the runtime
                                        ;      to do accessibility checks
                                        ;      to make sure the call is
                                        ;      allowed under the lan-
                                        ;      guage rules and class
                                        ;      hierarchy of the program.
miss:
          call  _picMissDispatch        ; C    Call to
                                        ;      _picMissDispatch.
                                        ;      _picMissDispatch is a
                                        ;      generic routine that is
                                        ;      able to dispatch the foo
                                        ;      method of any type of
                                        ;      object.
                                        ;      Note: it will never be
                                        ;      called for objects of type
                                        ;      'A' or 'B' from this call
                                        ;      site because they have
                                        ;      dedicated slots in the
                                        ;      PIC.
done:
```

Thus, a method of protecting slots in a PIC has been described. Such a protection scheme is particularly useful in a software multithreading environment. In accordance with principles of the invention, first, the type value associated with an object is compared with something it can never be, for instance initially an object type of R1 is compared with a type value of −1. Once the _picInit1 method performs an atomic compare and exchange to replace the type value in the compare instruction for the PIC slot with the method's memory location, a different value, e.g., 0 is placed in the type value of the compare instruction of the PIC slot to lock that slot from being updated or changed by another thread. Thus, a method of a first type can be called by one thread while another thread is accessing and using methods associated with other types, and hence, other slots in the PIC. While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. A method for implementing a polymorphic call site in a computer system executing an object oriented program, said method comprising the steps of:
   a) creating a template of a polymorphic inline cache for a polymorphic call site, the template having a plurality of slots;
   b) executing the polymorphic inline cache with an object of type k;
   c) invoking a polymorphic inline cache initialisation routine;
   d) finding an available k slot of the polymorphic inline cache;
   e) locking the k slot of the polymorphic inline cache;
   f) searching for a k method to call for the object of type k;
   g) filling the k slot with a call instruction to the k method;
   h) unlocking the k slot to complete the k slot; and
   i) calling the k method of the object of type k.

2. The method of claim 1, wherein a first thread may initialize and/or access the k slot at the same time a second thread is initializing and/or accessing a slot other than the k slot.

3. The method of claim 2, wherein a second thread calling the k method while the first thread is initializing the k slot waits until after said unlocking step (h).

4. The method of claim 2, wherein a second thread calling the k method while the first thread is initializing the k slot searches for and calls the k method and leaves the polymorphic inline cache unchanged.

5. The method of claim 1, wherein a polymorphic inline cache is created for each polymorphic call site.

6. The method of claim 1, wherein said creating step (a) further comprises inserting a first illegal type value in a compare instruction of every slot of the polymorphic inline cache to indicate each slot is empty.

7. The method of claim 6, wherein said locking step (e) further comprises replacing the first illegal type value in the compare instruction of the k slot with a second illegal type value to indicate the k slot is in use.

8. The method of claim 7, wherein said unlocking step (h) further comprises replacing the second illegal type value in the compare instruction of the k slot with a value of type k.

9. The method of claim 1, wherein said creating step (a) site further comprises puffing a bit in each slot to indicate that each slot is empty.

10. The method of claim 1, wherein said locking step (e) further comprises changing a bit in the k slot to indicate that the k slot is in use.

11. The method of claim 1, further comprising the step of (j) updating the polymorphic inline cache so that an object of type k+1 will initialize a corresponding k+1 slot.

12. The method of claim 11, wherein said updating step (j) further comprises inspecting the polymorphic inline cache to find the next empty slot.

13. The method of claim 12, wherein said polymorphic inline cache initialisation routine is the same for every object of the polymorphic inline cache.

14. The method of claim 11, wherein said updating step (j) further comprises maintaining a state of the k slot or the k+1 slot.

15. The method of claim 14, wherein said polymorphic inline cache initialization routine is the same for every object of the polymorphic inline cache.

16. The method of claim 15, wherein said updating step (j) further comprises modifying the state of the k+1 slot.

17. The method of claim 1, wherein said invoking step (c) further comprises calling a different initialization routine for every object of a different type.

18. The method of claim 11, wherein said updating step (j) further comprises modifying the initialization routine so that upon a cache miss of the k slot, the k+1 initialization routine is called.

19. A computer system for executing an object oriented program, comprising:
   means for executing an object oriented program;
   means for calling a first method from a first slot of a polymorphic inline cache;
   means for calling a second method from a second slot of the polymorphic inline cache;
   means for determining if the first method and the second method have an identical object type;
   means for calling the first method and the second method simultaneously if they do not have the identical object type; and
   means for preventing calling the second method from the second slot of the polymorphic inline cache until said means for calling the first method has completed if they have the identical object type.

20. The computer system of claim 19, wherein the first method may be called from a first thread and the second method may be called from an independently executing second thread.

21. The computer system of claim 20, further comprising:
   means for invoking a first polymorphic inline cache initialisation routine;
   means for locking the first slot of the polymorphic inline cache;
   means for filling the first slot with a call instruction to the first method while the first slot is locked;
   means for updating the polymorphic inline cache so that a second method of a second type will invoke a second polymorphic inline cache initialisation routine;
   means for making the first slot available to the first method;
   means for calling the first method;
   means for locking the second slot of the polymorphic inline cache;
   means for filling the second slot with a call instruction to the second method while the second slot is locked; and
   means for updating the polymorphic inline cache so that a Nth method of a Nth type will invoke a Nth polymorphic inline cache initialization routine.

22. The method of claim 21, wherein the first, second, and Nth polymorphic inline cache initialization routines are identical.

23. The method of claim 21, wherein the first polymorphic inline cache initialisation routine is called from a first thread simultaneously while an independently executing second or Nth thread is calling the second or Nth method or is calling the second or Nth polymorphic inline cache initialization routine.

* * * * *